No. 689,083. Patented Dec. 17, 1901.
J. HILL.
COLD STEEL OR IRON SAWING MACHINE.
(Application filed July 18, 1901.)
(No Model.) 2 Sheets—Sheet 1.

WITNESSES
Frederick James Richardson
Harry Gandy

INVENTOR
Joseph Hill

No. 689,083. Patented Dec. 17, 1901.
J. HILL.
COLD STEEL OR IRON SAWING MACHINE.
(Application filed July 18, 1901.)
(No Model.) 2 Sheets—Sheet 2.

WITNESSES
Frederick James Richardson
Harry Gandy

INVENTOR
Joseph Hill

UNITED STATES PATENT OFFICE.

JOSEPH HILL, OF DERBY, ENGLAND.

COLD STEEL OR IRON SAWING MACHINE.

SPECIFICATION forming part of Letters Patent No. 689,083, dated December 17, 1901.

Application filed July 18, 1901. Serial No. 68,831. (No model.)

*To all whom it may concern:*

Be it known that I, JOSEPH HILL, a subject of the King of Great Britain and Ireland, residing at Derby, in the county of Derby, England, have invented new and useful Improvements in Cold Steel or Iron Sawing Machines, of which the following is a specification.

The object of my invention is to produce a simple and effective machine for sawing or cutting cold steel or iron girders and the like to any angle with the least possible resetting or adjusting of the work to be operated upon—that is to say, instead of moving or setting the work to suit the saw (which in ordinary cold-metal-sawing machines is a fixture traversing in one plane) the saw is swiveled or revolved to the angle required, thus obviating the necessity of moving and setting the work to the angle required.

My said invention is illustrated in the accompanying drawings, in which—

Figure 1:
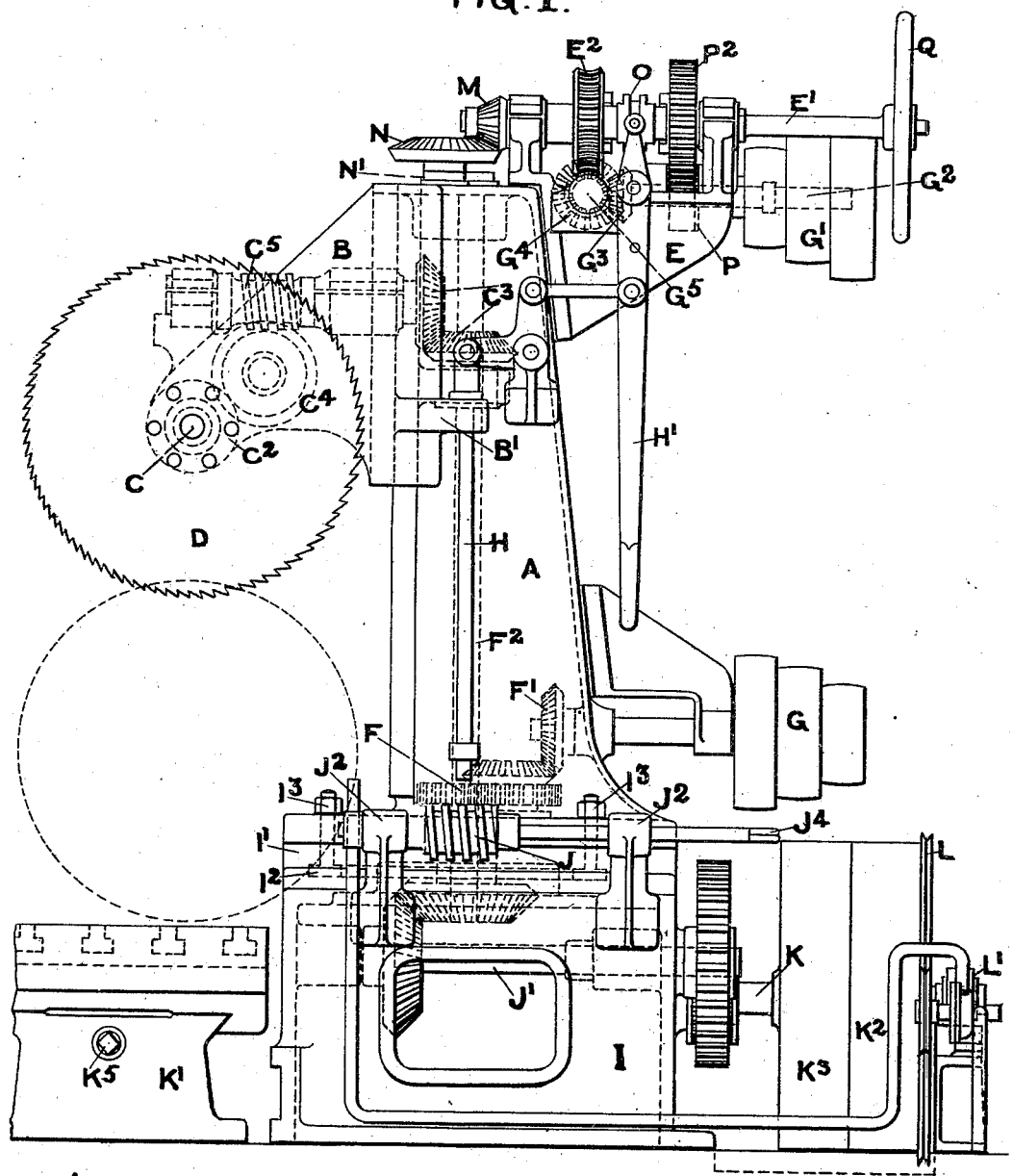
Figure 2:
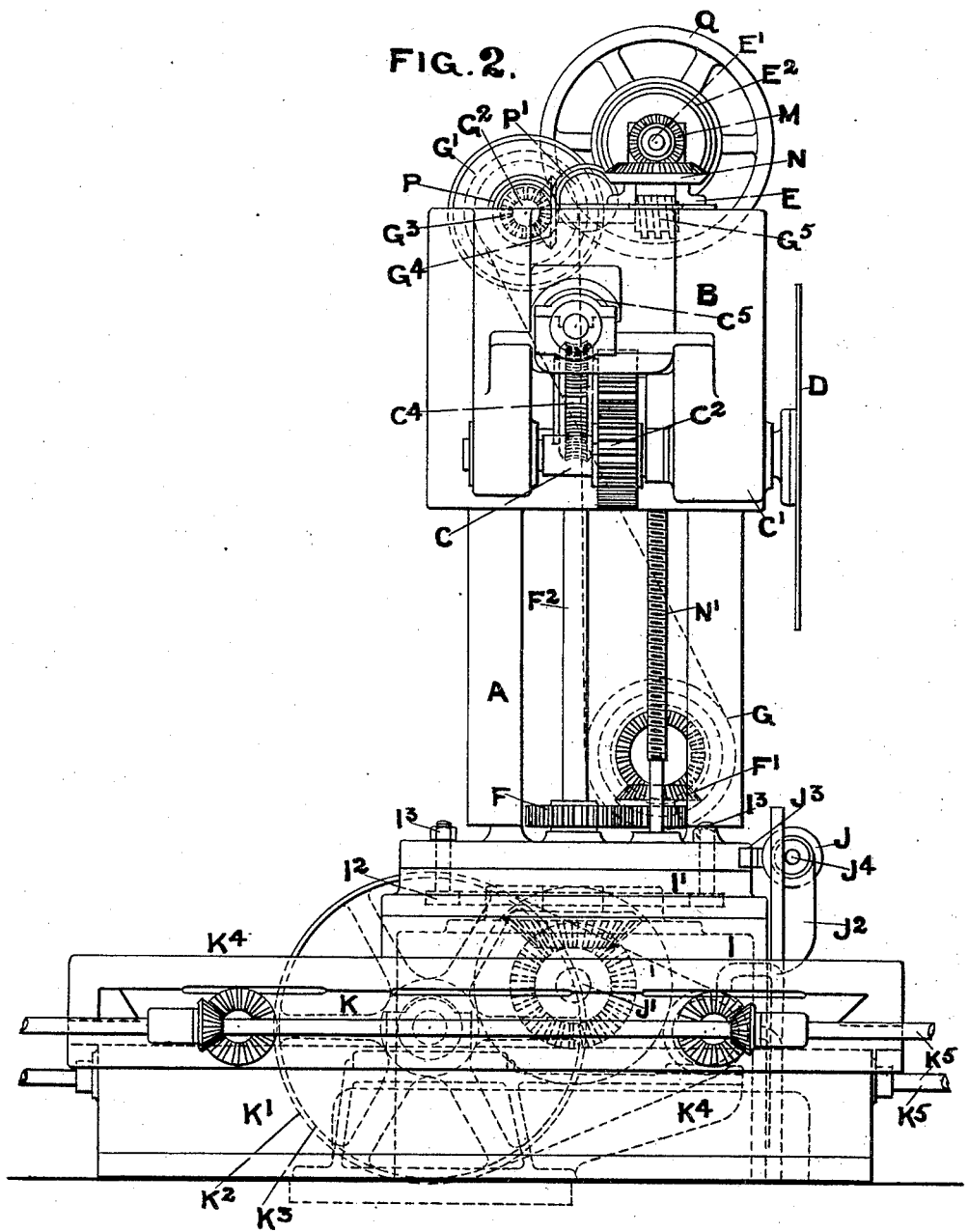

Figure 1 is a front elevation, and Fig. 2 an end elevation, of the machine.

Similar letters refer to similar parts throughout both views.

The machine consists of a vertical slide or standard A, which is provided with a vertically-slidable carriage or saddle B, carrying a strong steel spindle C, running in bearings formed on the carriage B, one of these bearings C', Fig. 2, being conical and running in a phosphor-bronze bush. On the end of the spindle C is the saw D for operating on the work. The spindle C is driven by steel spur- and-miter gearing $C^2$ $C^3$, steel worm $C^5$, and phosphor-bronze worm-wheel $C^4$, carried on the carriage or saddle B.

On the top of the vertical slide or standard A is fixed a bracket E, carrying the self-acting downfeed traverse motion to the saw D and also the quick return motion to the same after completion of the cutting operation. These traverse motions are variable and are driven from the driving-shaft $F^2$ in the vertical slide or standard A by spur-and-miter gearing F F' and then by belt through the three-speeded cones G and G'.

The self-acting downward traverse motion is as follows: On the top cone-shaft $G^2$, at the end opposite to the three-speeded cone G', I key on a bevel-pinion $G^3$, gearing into a bevel-wheel $G^4$, which is keyed onto the end of the worm-shaft $G^5$, running at right angles to the overhead driving-shaft E'. The worm and shaft are turned out of the solid-steel forging, this worm-shaft $G^5$ revolving in bearings formed on the bracket E and gearing into the worm-wheel $E^2$. This worm-wheel $E^2$ runs loose on the overhead driving-shaft E' and has a clutch cast on one side of it. On the end of the overhead driving-shaft E', I key on a bevel-pinion M, gearing into a bevel-wheel N, which is keyed onto the top end of the screw N' in the vertical slide or standard A. The motion is put into operation by throwing the clutch O, Fig. 1, into gear with the worm-wheel $E^2$ by means of the long hand-lever H'.

The self-acting upward quick traverse motion is as follows: On the top cone-shaft $G^2$, I key on a spur-pinion P for driving the upward quick traverse motion. This pinion gears into an intermediate pinion P', Fig. 2, which gears into a spur-wheel $P^2$, Fig. 1, this spur-wheel $P^2$ running loose on the overhead driving-shaft E' and having a clutch cast on one side of it. This motion is put into operation by throwing the clutch O, Fig. 1, into gear with the spur-wheel $P^2$ by means of the long hand-lever H'. This self-acting upward quick traverse communicates its motion through the bevel-pinion M and the bevel-wheel N. The hand-wheel Q on the end of the overhead driving-shaft E' is for the purpose of adjusting by hand the carriage or saddle B on the vertical slide or standard A. These feed traverse motions are thrown out of gear in either direction by the tappet-rod H, Fig. 1, operated by the boss B', cast on the carriage or saddle B, this boss B' coming into contact (as the carriage or saddle B traverses up or down) with the tappets on the tappet-rod H, throwing one or the other motion out of gear. The two traverse motions are put into gear, either one or the other, by the long hand-lever H', Fig. 1. The tappet-motion H prevents the saw overrunning in either direction and is so arranged as to be in operation at whatever angle the saw is working.

The circular base of the vertical slide or standard A is made to swivel on a square bed I with circular tops I' and is swiveled around by hand to the desired angle by means of the worm-wheel segment J³, Fig. 2, which is secured on the circular base of the vertical slide or standard A, and by the worm J, gearing into the worm-wheel segment J³ and carried on the worm-shaft J⁴, which revolves in bearings J², fixed on the side of the square base or bed I. The worm J and worm-shaft J⁴ are revolved by hand by means of an ordinary handle or any other suitable device fixed upon the squared end of the worm-shaft J⁴. In the square base or bed I is an annular T-slot I², in which are placed T-headed bolts I³. These bolts revolve with the vertical slide or standard A when it is swiveled around to the angle determined upon and are for the purpose of bolting the vertical slide or standard A rigidly to the square base or bed I when it is at the desired angle.

In the square base or bed I is the driving-gear, consisting of driving-shaft J' and counter-shaft K, on which are the fast and loose pulleys K² K³ for driving the machine.

Bolted rigidly to the front of the square base or bed I of the machine and for carrying the work to be operated upon is a strong compound-slide work-table K', of any desired width, length, and capacity and adjusted longitudinally and transversely by hand by means of screws K⁵ and bevel-gearing K⁴.

The saw may be lubricated with a constant pressure of fluid, supplied, preferably, by an ordinary centrifugal pump L', driven from the grooved pulley L, Fig. 1, on the driving-pulley K² of the machine.

Should it be required, the saw D may be removed, and in its place any form of milling-cutter may be substituted, as the machine lends itself to be used for milling purposes.

What I claim as my invention, and desire to secure by Letters Patent, is—

1. In a metal-cutting machine, the combination, with a base, and a rotary standard pivoted on the base; of a driving-shaft journaled on the axis of the said standard, a saddle which slides on the said standard, a cutter-shaft journaled in the said saddle, driving mechanism connecting the said cutter-shaft with the said driving-shaft, traversing mechanism for the saddle arranged at the upper part of the said standard and provided with a driving-pulley, and a counter-shaft driven from the said driving-shaft and provided with a driving-pulley under the aforesaid driving-pulley, substantially as set forth.

2. In a metal-cutting machine, the combination, with a base, and a rotary standard pivoted on the said base; of a work-table arranged on one side of the said base, a saddle which slides vertically on the said standard and overhangs the said work-table, a cutter-shaft journaled in the said saddle over the said work-table, a driving-shaft journaled on the axis of the said standard, driving mechanism connecting the said cutter-shaft with the said driving-shaft, and traversing mechanism for the saddle carried by the said standard and operated by the said driving-shaft, substantially as set forth.

In testimony whereof I have signed my name to this specification in the presence of two subscribing witnesses.

JOSEPH HILL.

Witnesses:
FREDERICK JAMES RICHARDSON,
HARRY GANDY.